United States Patent
Hongo et al.

(10) Patent No.: US 8,180,415 B2
(45) Date of Patent: *May 15, 2012

(54) WATER-SHIELDING TYPE MOBILE TERMINAL APPARATUS

(75) Inventors: Manabu Hongo, Kawasaki (JP); Hidehiko Hizuka, Kawasaki (JP); Tatsuhito Araki, Kawasaki (JP); Hidekatsu Kobayashi, Kawasaki (JP); Hiroaki Matsuda, Kawasaki (JP); Satoshi Sudo, Kawasaki (JP); Wataru Murata, Kawasaki (JP); Takashi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,244

(22) Filed: Mar. 8, 2011

(65) Prior Publication Data

US 2011/0159933 A1 Jun. 30, 2011

Related U.S. Application Data

(63) Continuation of application No. 11/870,745, filed on Oct. 11, 2007, now Pat. No. 7,925,316.

(30) Foreign Application Priority Data

Nov. 24, 2006 (JP) ................................. 2006-317612

(51) Int. Cl.
*H04M 1/00* (2006.01)
(52) U.S. Cl. ................ 455/575.3; 455/575.1; 455/575.8
(58) Field of Classification Search ............... 455/573.3, 455/572, 575.1, 575.8, 90.3, 347; 429/97, 429/100
See application file for complete search history.

(56) References Cited

U.S. PATENT DOCUMENTS

| 5,471,667 | A | 11/1995 | Yamada |
| 5,625,688 | A * | 4/1997 | Ford et al. ............... 379/433.09 |
| 5,639,570 | A | 6/1997 | Tamaru |
| 7,303,424 | B2 * | 12/2007 | Tu et al. ....................... 439/372 |
| 7,383,029 | B2 * | 6/2008 | Sasaki et al. ................. 455/128 |
| 7,488,555 | B2 * | 2/2009 | Chen et al. .................... 429/100 |
| 7,542,789 | B2 * | 6/2009 | Liu et al. ..................... 455/575.8 |
| 7,700,223 | B2 | 4/2010 | Ge et al. |

(Continued)

FOREIGN PATENT DOCUMENTS

JP 3-013907 U 2/1991

(Continued)

OTHER PUBLICATIONS

Japanese Notification of Reasons for Refusal, English-language translation, dated Nov. 16, 2010 for corresponding Japanese Application No. 2006-317612. Korean Office Action dated Jul. 10, 2008, issued in corresponding Korean Patent Application No. 10-2007-0094760.

(Continued)

*Primary Examiner* — Brandon Miller
(74) *Attorney, Agent, or Firm* — Fujitsu Patent Center

(57) ABSTRACT

The mobile terminal apparatus of the present invention includes a housing having an opening section in which an accommodated object is fitted; a lid covering the opening section, the lid having a protrusion which surrounds the opening section and shields the accommodated object from water, on a surface facing the accommodated object; and a cover covering the lid, the cover being attached to the housing to press the lid onto the housing. When the cover is attached to the housing, the protrusion of the lid surrounds the opening section and is pressed onto the housing by the cover, so that the accommodated object can be reliably shielded from water.

3 Claims, 17 Drawing Sheets

U.S. PATENT DOCUMENTS

| | | | |
|---|---|---|---|
| 7,925,316 B2 * | 4/2011 | Hongo et al. | 455/575.3 |
| 8,024,015 B2 | 9/2011 | Araki et al. | |
| 2004/0195783 A1 | 10/2004 | Akagi et al. | |
| 2004/0224220 A1 * | 11/2004 | Wang et al. | 429/96 |
| 2004/0233653 A1 | 11/2004 | Luo et al. | |
| 2006/0172184 A1 | 8/2006 | Hasuda | |
| 2007/0122693 A1 * | 5/2007 | Qin et al. | 429/97 |
| 2009/0117957 A1 | 5/2009 | Araki et al. | |

FOREIGN PATENT DOCUMENTS

| | | |
|---|---|---|
| JP | 06-284020 | 10/1994 |
| JP | 08-233108 | 9/1996 |
| JP | 8-233108 A | 9/1996 |
| JP | 9-007570 A | 1/1997 |
| JP | 10-058759 A | 3/1998 |
| JP | 10-271194 A | 10/1998 |
| JP | 2002-353647 A | 12/2002 |
| JP | 2004-056164 A | 2/2004 |

OTHER PUBLICATIONS

USPTO, Notice of Allowance and Notice of Allowability, Dec. 17, 2010, in U.S. Appl. No. 11/870,745 [now issued].

USPTO, Non-Final Rejection, Jun. 23, 2010, in U.S. Appl. No. 11/870,745 [now issued].

Japanese Office Action mailed Jun. 28, 2011 for corresponding Japanese Application No. 2006-317612, with English-language Translation.

Japanese Office Action—Decision of Refusal, mailed Feb. 7, 2012 for corresponding Japanese Application No. 2006-317612, with English-language translation.

Japanese Office Action—Decision of Dismissal of Amendments, mailed Feb. 7, 2012 for corresponding Japanese Application No. 2006-317612, with English-language translation.

USPTO, [Miller] Non-Final Rejection, Mar. 26, 2012, in related U.S. Appl. No. 13/359,711.

* cited by examiner

WATER-SHIELDING TYPE MOBILE TERMINAL APPARATUS

BACKGROUND OF THE INVENTION

1. Field of the Invention

The present invention relates to a watertight mobile terminal apparatus.

2. Description of the Related Art

Conventionally, telephone calls and transmission and reception of electronic mails using a cellular phone, and the like are widely used for communication with members of a family and friends. By using communication means such as telephone and electronic mail, one can easily contact any distant members of his or her family and friends when desired.

Further, in recent years, cellular phone and PDA (Personal Digital Assistant) are utilized not only as simple communication means, but also as image taking apparatuses for taking images of subjects, computers for viewing Web sites, alarm clocks used on the road, or the like. With the increase in the variety of uses for the mobile terminal apparatus, the number of various electronic parts mounted on the mobile terminal apparatus has increased and it is necessary to provide the mobile terminal apparatus with watertight function. Particularly, it is required that a battery pack can be easily removed and reliably shielded from water, because the battery pack is connected to various electronic parts in the mobile terminal apparatus and may be removed by a user.

In this respect, in Japanese Patent Laid-Open No. 2002-353647, a watertight apparatus is described in which an opening section provided in a housing is closed by a rotationally-locked lid with an intervening rubber packing. By fitting a battery pack in the opening section of the housing, the battery pack can be removably attached to the housing and reliably shielded from water.

However, in the technique described in Japanese Patent Laid-Open No. 2002-353647, it is necessary to provide a knob to be pinched by the user on the rotationally-locked lid. Further, it is necessary to make the lid large so that children and elderly persons can also easily rotate the lid with small force, which results in a problem of size increase of the apparatus. Moreover, it is necessary to tightly close the lid with a thick intervening packing in order to reliably shield the inside of the opening from water, which results in a problem of deterioration of user operability.

SUMMARY OF THE INVENTION

The present invention has been made in view of the above circumstances and provides a mobile terminal apparatus, which has good operability and reliable watertight property.

A mobile terminal apparatus according to the present invention includes:

a housing having an opening section in which an accommodated object is fitted;

a lid covering the opening section, the lid comprising a protrusion which surrounds the opening section and shields the accommodated object from water, the protrusion being disposed on a surface facing the accommodated object; and a cover covering the lid, the cover being attached to the housing and thereby pressing the lid onto the housing.

According to the mobile terminal apparatus of the present invention, when the cover is attached to the housing, the protrusion of the lid surrounds the opening section and is pressed onto the housing by the cover, so that the accommodated object can be reliably shielded from water. In addition, it is not necessary that a user tightly rotates the lid with an intervening rubber packing. Instead, by simply attaching the cover to the housing, the mobile terminal apparatus can be easily rendered watertight.

Further, in the mobile terminal apparatus of the present invention, it is preferable that the protrusion of the lid is elastic.

The opening section is surrounded by the elastic protrusion without any gap, so that the accommodated object can be reliably shielded from water.

Further, in the mobile terminal apparatus of the present invention, it is preferable that the cover has a protrusion which abuts the lid and presses the lid onto the housing, and that the protrusion is disposed on a surface facing the lid.

By providing the cover with the protrusion which presses the lid onto the housing, the lid can be reliably pressed onto the housing to improve watertight performance.

Further, in the mobile terminal apparatus of the present invention, it is preferable that the lid rotates around a shaft to open and close the opening section, and the housing includes a shaft receiving section which receives the shaft in a rotatable manner, the shaft being removably attached to the shaft receiving section.

According to the preferable mobile terminal apparatus of the present invention, the lid can be easily opened and closed with small force.

Further, in the mobile terminal apparatus of the present invention, it is preferable that the housing includes a guide extending in a predetermined direction, the cover is slid along the guide and thereby attached to the housing, and the lid opens and closes around a rotating shaft extending in a direction in which the cover is slid.

According to the preferable mobile terminal apparatus of the present invention, it can be avoided that the lid is accidentally opened when the cover is attached or removed, which can lead to damage of the lid.

Further, in the mobile terminal apparatus of the present invention, it is preferable that the housing includes a groove formed in a portion corresponding to the cover, and the cover includes a lock mechanism which is engaged with the groove and thereby is locked to the housing.

By locking the cover to the housing by the lock mechanism, the watertight function of the mobile terminal apparatus can be further improved.

In the mobile terminal apparatus of the present invention, it is preferable that the accommodated object is a battery.

A battery may be preferably applied as an accommodated object referred in the present invention, because it is required that the battery can be easily removed and reliably shielded from water.

Further, in the mobile terminal apparatus of the present invention, it is preferable that a surface opposite to the facing surface of the lid is non-permeable to water.

By forming the surface of the lid facing the cover with a metal plate and the like which is non-permeable to water, the accommodated object can be reliably shielded from water.

Further, in the mobile terminal apparatus of the present invention, it is preferable that the facing surface of the lid is elastic.

According to this preferable mobile terminal apparatus, the lid is pressed onto the accommodated object to reliably close any gap, so that the watertight property for the accommodated object can be improved.

Further, in the mobile terminal apparatus of the present invention, it is preferable that the lid includes an auxiliary protrusion in an inner region of the facing surface which is surrounded by the protrusion.

By providing the surface of the lid facing the accommodated object with the auxiliary protrusions in addition to the protrusion, the accommodated object can be more efficiently shielded from water.

According to the present invention, a mobile terminal apparatus which has good operability and reliable watertight property can be provided.

DETAILED DESCRIPTION OF THE INVENTION

Now, an embodiment of the present invention will be described with reference to the drawings.

Figure 1:
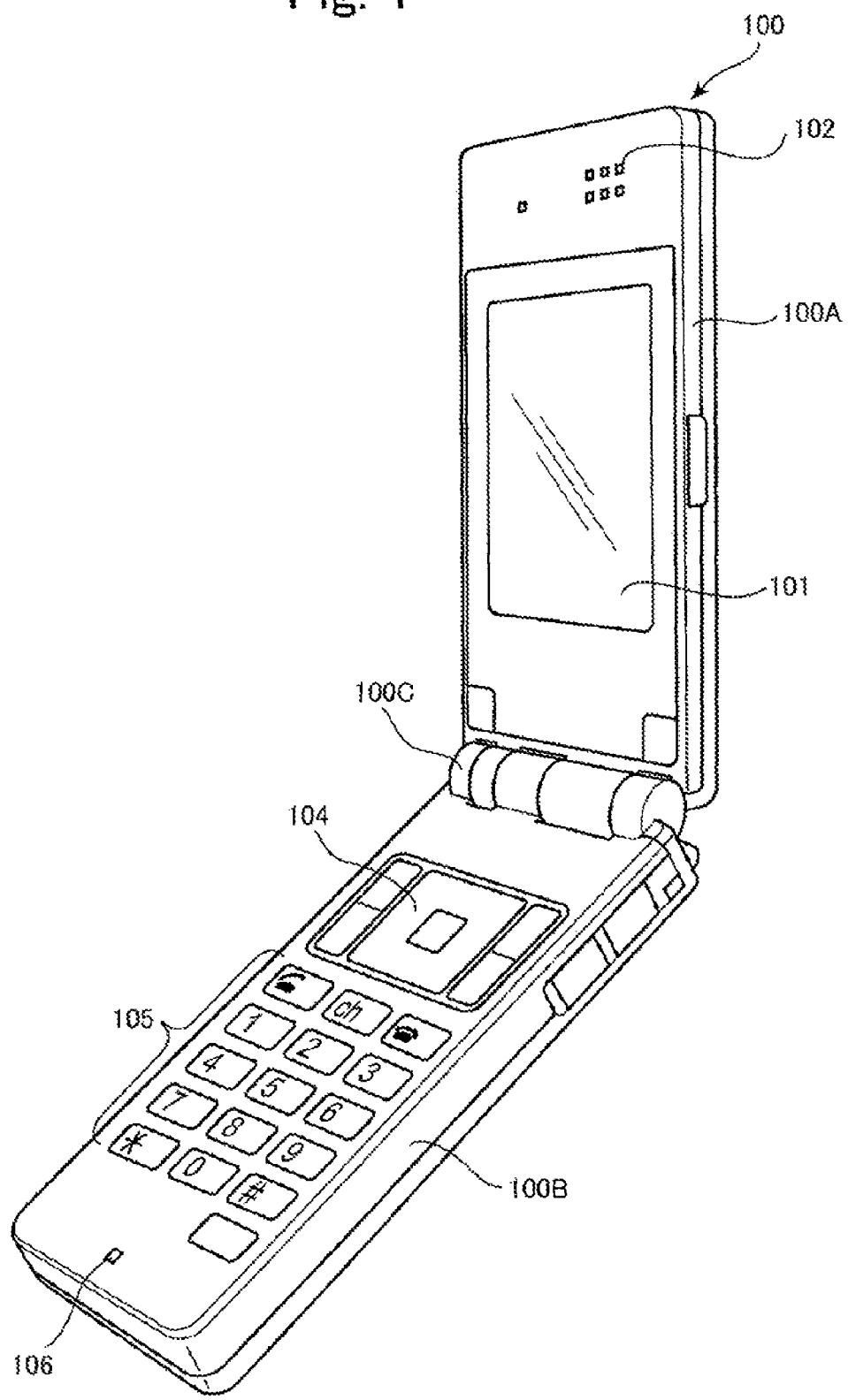
FIG. 1 is an outside perspective view of a cellular phone to which one embodiment of the present invention is applied.

FIG. 1 is an outside perspective view of a cellular phone to which one embodiment of the present invention is applied.

A cellular phone 100 shown in FIG. 1 includes mainly a data communication function for transmitting/receiving voice and electronic mails and the like to/from external apparatuses and an image taking function for taking images of subjects. The whole cellular phone 100 has watertight function.

The cellular phone 100 is configured by coupling an upper housing 100A that a user puts to his/her ear during a telephone call and a lower housing 100B that the user holds in his/her hand, in such a manner that they can be folded around a hinge section 100C. In this description, in the upper housing 100A and the lower housing 100B, surfaces which hide when the cellular phone 100 is folded are referred to as front surfaces and surfaces which are opposite to the front surfaces and expose when the cellular phone 100 is folded are referred to as back surfaces. The upper housing 100A and the lower housing 100B correspond to examples of a housing referred in the present invention.

The upper housing 100A includes, on its front surface, a liquid crystal panel 101 on which a menu screen and taken images and the like are displayed and an earpiece 102 for transmitting voice emitted from a speaker provided therein. The lower housing 100B includes, on its front surface, a select button 104 used for selection of various functions or used as a shutter button when taking images, push buttons 105 for inputting telephone numbers and the like, and a mouthpiece 106 for transmitting voice to a microphone provided therein.

Figure 2:
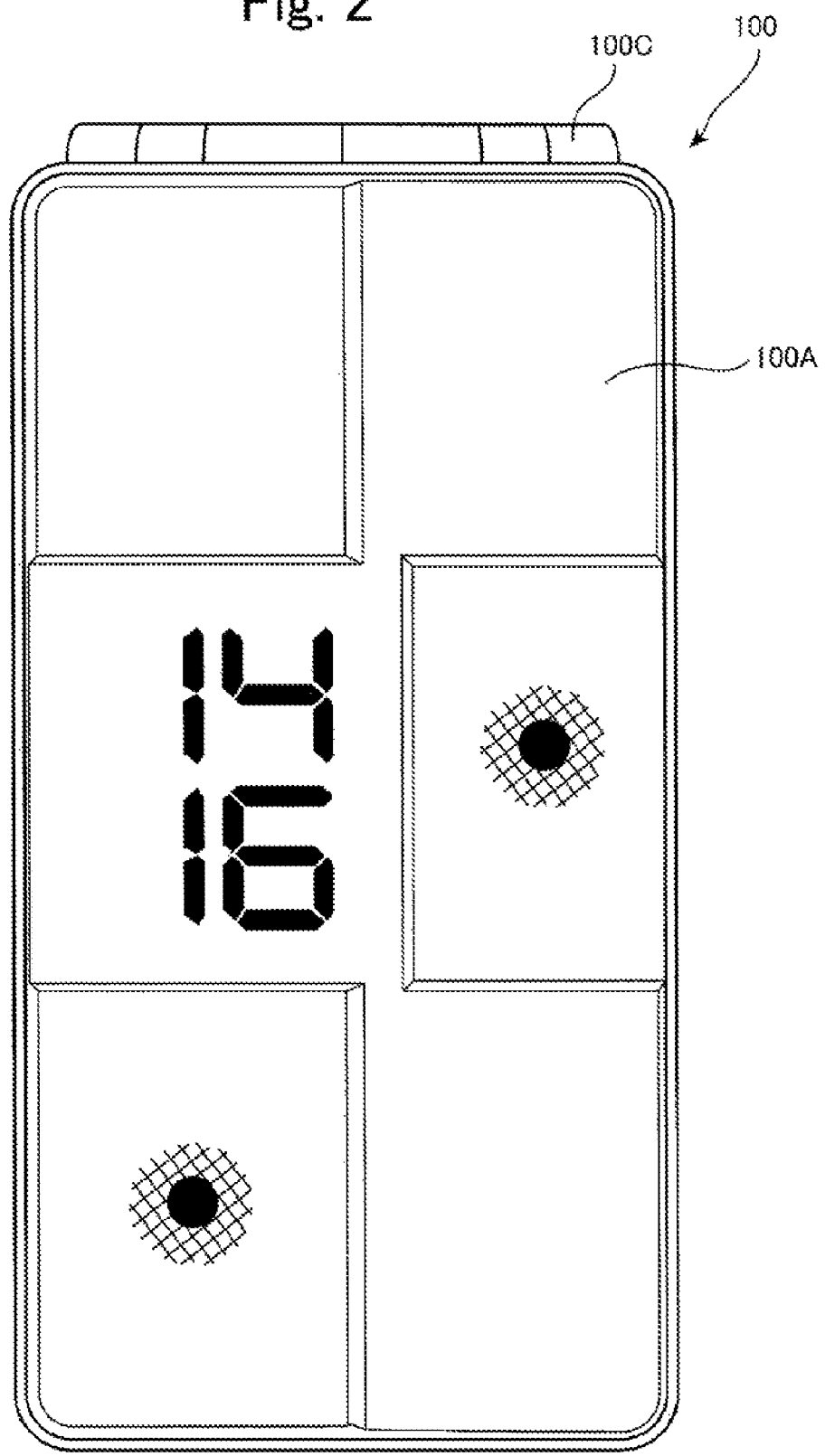
FIG. 2 is a view showing a back surface of an upper housing.

FIG. 2 is a view showing the back surface of the upper housing 100A.

On the back surface of the upper housing 100A, a backlight (described later) and a back surface liquid crystal panel (described later) are incorporated. Light from the backlight and the back surface liquid crystal panel transmits through the upper housing 100A to display a clock and patterns.

Figure 3:
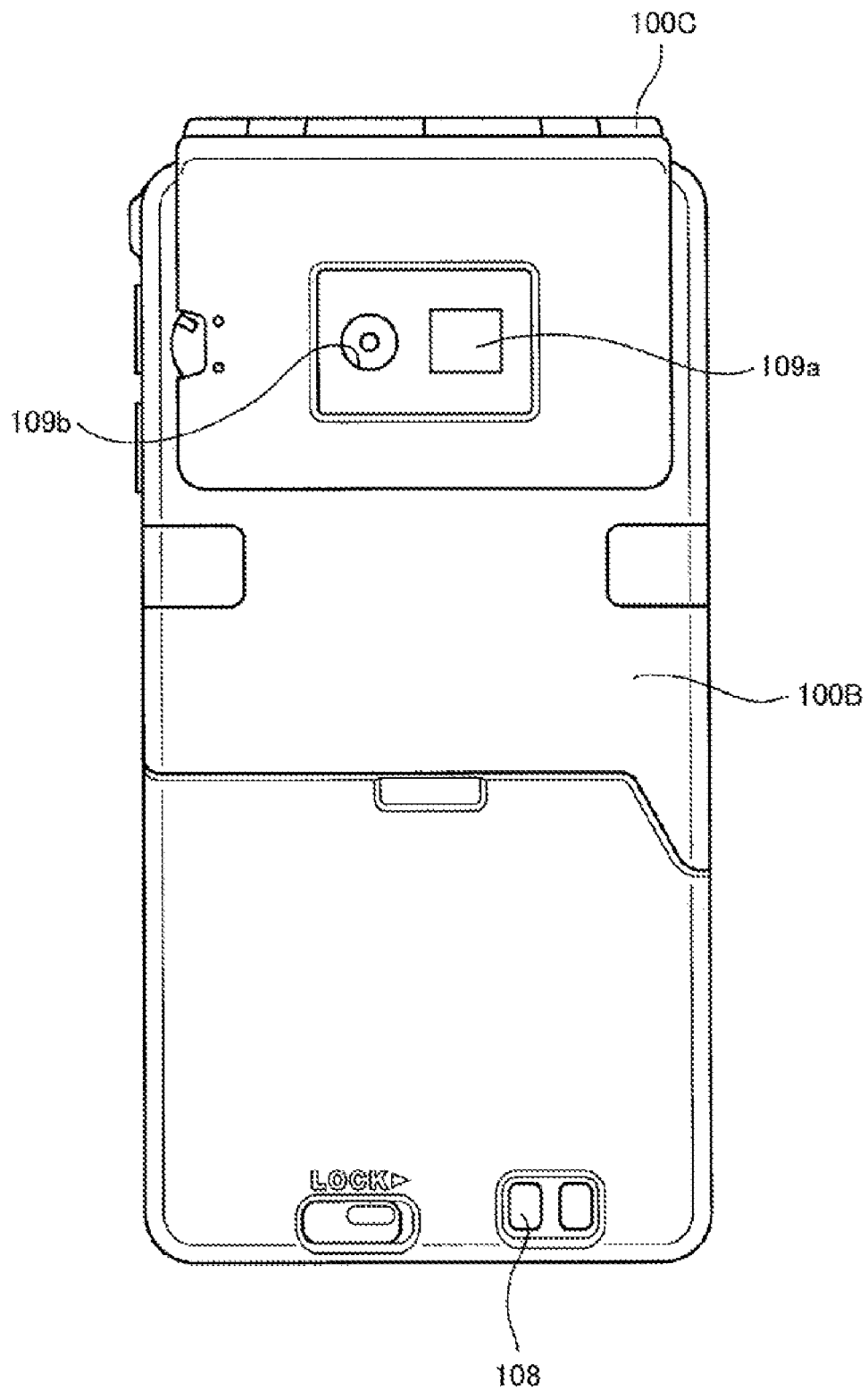
FIG. 3 is a view showing a back surface of a lower housing.

FIG. 3 is a view showing the back surface of the lower housing 100B.

On the back surface of the lower housing 100B, a charging terminal 108 is provided which is connected to an external charger when charging. Near the hinge section 100C, there are incorporated a short-range antenna 109a for transmitting and receiving images and address information and the like via wireless communication for short range, and an image taking lens 109b for imaging subject lights. Further, on the back surface of the lower housing 100B, a long-range antenna 107 (see FIG. 5) is also incorporated for transmitting and receiving data such as voice and electronic mails via a base station, although not shown in FIG. 3.

When transmitting voice and electronic mails and the like with the cellular phone 100, the user inputs telephone numbers and electronic mail addresses and the like with the push buttons 105 so that data is directed to specified communication destinations via wireless communication for long range. The data originated from the cellular phone 100 is once received at the base station and then transmitted from the base station to the communication destinations via telephone lines, LAN lines, other base stations, etc. Conversely, data transmitted from the other party is received at the base station, converted into radio data and then transmitted to the cellular phone 100.

When taking images of subjects with the cellular phone 100, the user pushes the select button 104 while aiming the image taking lens 109b at a subject, so that an image is taken by a camera device (see FIG. 4) incorporated in the cellular phone 100.

Next, an inner structure of the cellular phone 100 will be described.

Figure 4:
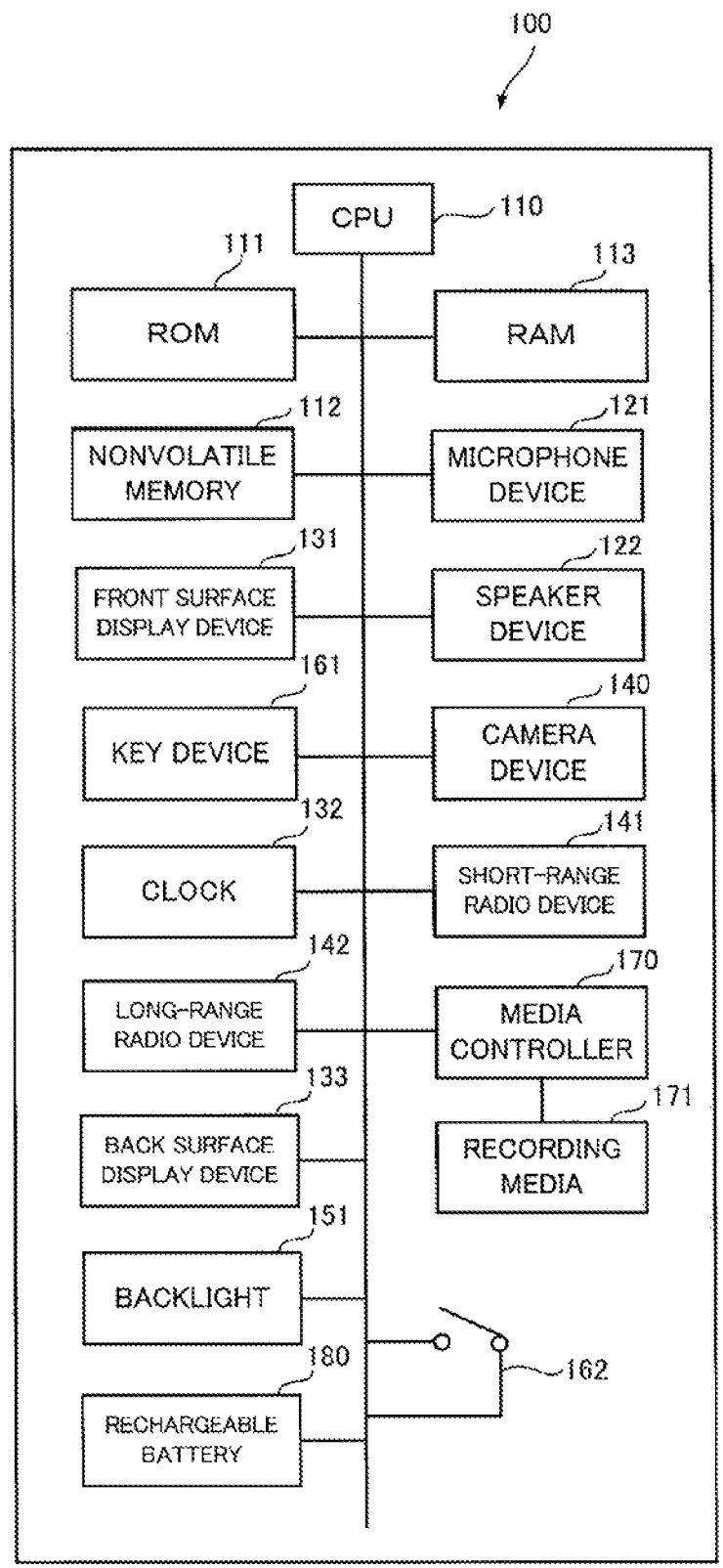
FIG. 4 is an inside block diagram of the cellular phone.

FIG. 4 is an inside block diagram of the cellular phone 100.

In FIG. 4, a CPU 110, a ROM 111, a nonvolatile memory 112, a RAM 113, a microphone device 121, a speaker device 122, a front surface display device 131, a clock 132, a back surface display device 133, a camera device 140, a short-range wireless device 141, a long-range communication device 142, a backlight 151, a key device 161, an open/close switch 162, and a media controller 170 are shown and they are interconnected via buses. A recording media 171 and a rechargeable battery 180 are also connected to the cellular phone 100.

The CPU 110 has a function of executing various programs and controls the whole cellular phone 100.

In the ROM 111, various programs which are executed by the CPU 110 and various constants which are required to execute the various programs are stored. The CPU 110 executes the programs stored in the ROM 111, using the RAM 113 as a work area.

In the nonvolatile memory 112, various information such as an address book and received electronic mails is recorded, which may be rewritten.

The microphone device 121 is a microphone for picking up voice of the user and a function block of processing the voice picked up by the microphone.

The speaker device 122 is a speaker for outputting voice toward the user and a function block of generating voice signals for driving the speaker.

The short-range wireless device 141 is intended to transmit images and telephone numbers and the like to external apparatuses which are located at short distance without involving base stations, by using the short-range antenna 109*a* shown in FIG. 3. In this embodiment, infrared communication is employed.

The camera device 140 is a block of collecting image data obtained by photo-taking, the front surface display device 131 is a block of displaying images to the liquid crystal panel 101 provided on the front surface of the upper housing 100A shown in FIG. 1, the clock 132 is a block for obtaining the current time, the back surface display device 133 is a block of displaying images to the back surface liquid crystal panel (described later) incorporated in the back surface of the upper housing 100A shown in FIG. 2, the backlight 151 is intended to emit light toward the back surface of the upper housing 100A, and the key device 161 is a block of detecting key operations of the select button 104 and the push buttons 105 (see FIG. 1) by the user.

The open/close switch 162 is a switch which turns on when the upper housing 100A and the lower housing 100B of the cellular phone 100 are opened and turns off when they are closed. When the upper housing 100A and the lower housing 100B of the cellular phone 100 are opened and the open/close switch 162 turns on, the CPU 110 causes the clock and the like to be displayed on the liquid crystal panel 101 provided on the front surface of the upper housing 100A. On the other hand, when the upper housing 100A and the lower housing 100B of the cellular phone 100 are closed and the open/close switch 162 turns off, the CPU 110 causes the backlight 151 provided on the back surface of the upper housing 100A to emit light and causes the clock to be displayed on the back surface liquid crystal panel. The backlight 151 and the back surface liquid crystal panel will be described later in detail.

The media controller 170 is intended to read out data from the recording media 171 and write image data generated by the camera device 140 and the like into the recording media 171.

Figure 5:
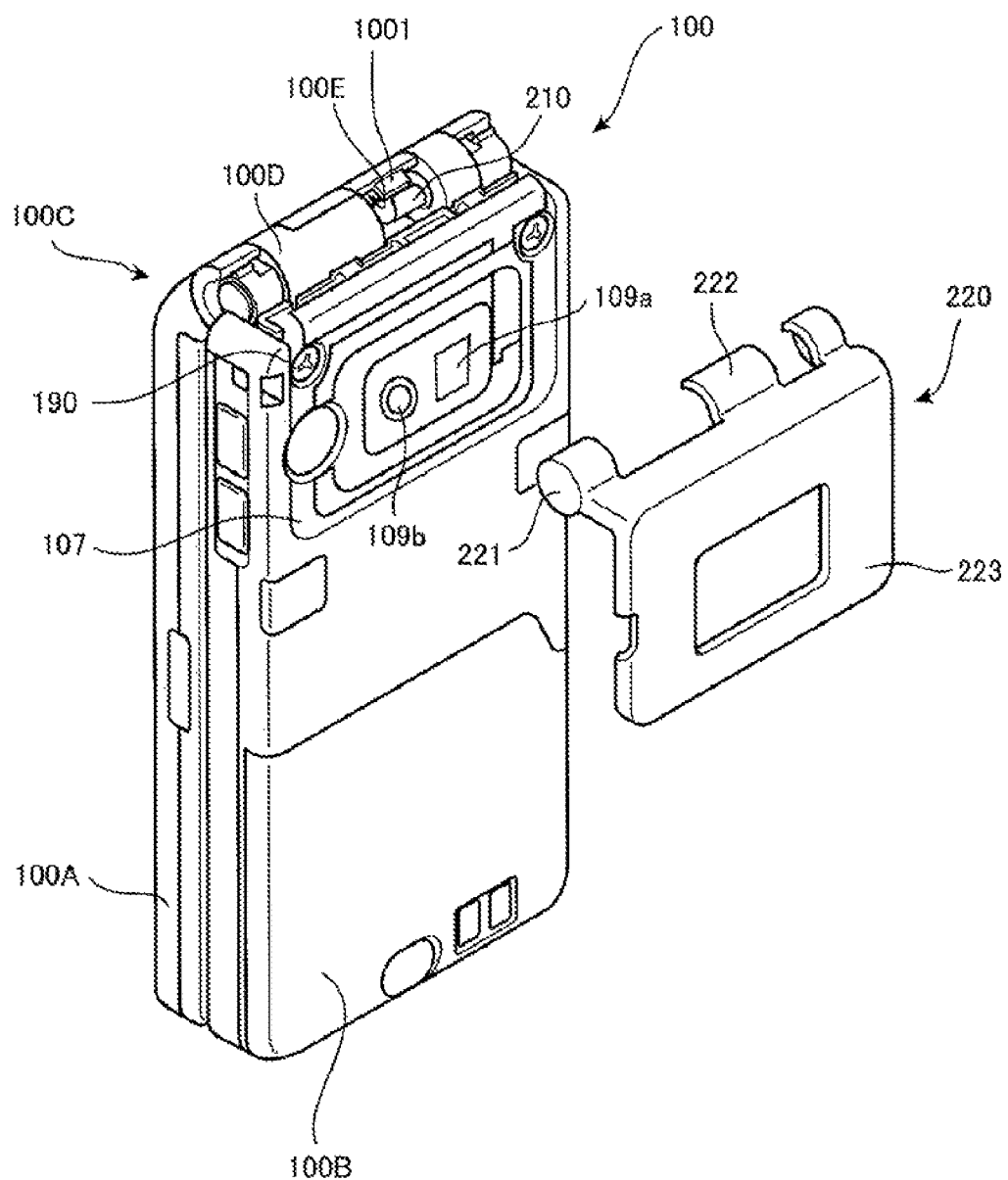
FIG. 5 is an exploded perspective view of a hinge section of the cellular phone.

Further, the long-range communication device 142 serves to transmit and receive telephone calls and electronic mails and the like via the long-range antenna 107 (see FIG. 5). The data transmitted from the long-range communication device 142 is sent via the base station to other telephones and personal computers.

The cellular phone 100 is configured as described above, basically.

Hereinafter, a configuration near the hinge section 100C of the cellular phone 100 shown in FIG. 1, a configuration on the back surface of the upper housing 100A shown in FIG. 2, a configuration near the rechargeable battery 180 shown in FIG. 4, and a configuration near the charging terminal 108 shown in FIG. 3 will be described in detail, sequentially.

First, the configuration near the hinge section 100C of the cellular phone 100 will be described.

FIG. 5 is an exploded perspective view of the hinge section 100C of the cellular phone 100.

The hinge section 100C of the cellular phone 100 also shown in FIG. 1 is composed of a hinge 210 which couples the upper housing 100A and the lower housing 100B in a rotatable manner and a hinge cover 220 which is attached to the hinge 210 to hide the hinge 210. The hinge 210 corresponds to an example of a hinge referred in this invention and the hinge cover 220 corresponds to an example of a hinge cover referred in this invention.

On the back surface of the lower housing 100B, the short-range antenna 109*a* and the image taking lens 109*b* also shown in FIG. 3 are incorporated. In addition, screws 190 for tightening the lower housing 100B and the long-range antenna 107 surrounding the short-range antenna 109*a* and the image taking lens 109*b* and the like are mounted. The long-range antenna 107 corresponds to an example of an antenna referred in this invention and the screws 190 correspond to examples of a tightening member referred in this invention.

In the coupling surface of the upper housing 100A and the lower housing 100B, there are formed a groove 100E in which the hinge 210 is fitted, a hinge cover section 100D which covers the hinge 210 and holds the hinge in a rotatable manner, and a claw fixing section 1001 in which a claw (described later) provided on the hinge cover 220 is fitted. The groove 100E corresponds to an example of a groove referred in this invention.

The hinge cover 220 is composed of end cover sections 221 which cover ends of the hinge 210, an outer circumference cover section 222 which hides the outer circumferential surface of the hinge 210, and a housing cover section 223 which covers a part of the lower housing 100B. On the outer circumference cover section 222, the claw (not shown) which is fitted in the claw fixing section 1001 is provided. The outer circumference cover section 222 corresponds to an example of an outer circumference cover section referred in this invention and the end cover sections 221 correspond to examples of both-end cover sections referred in this invention.

Figure 6:
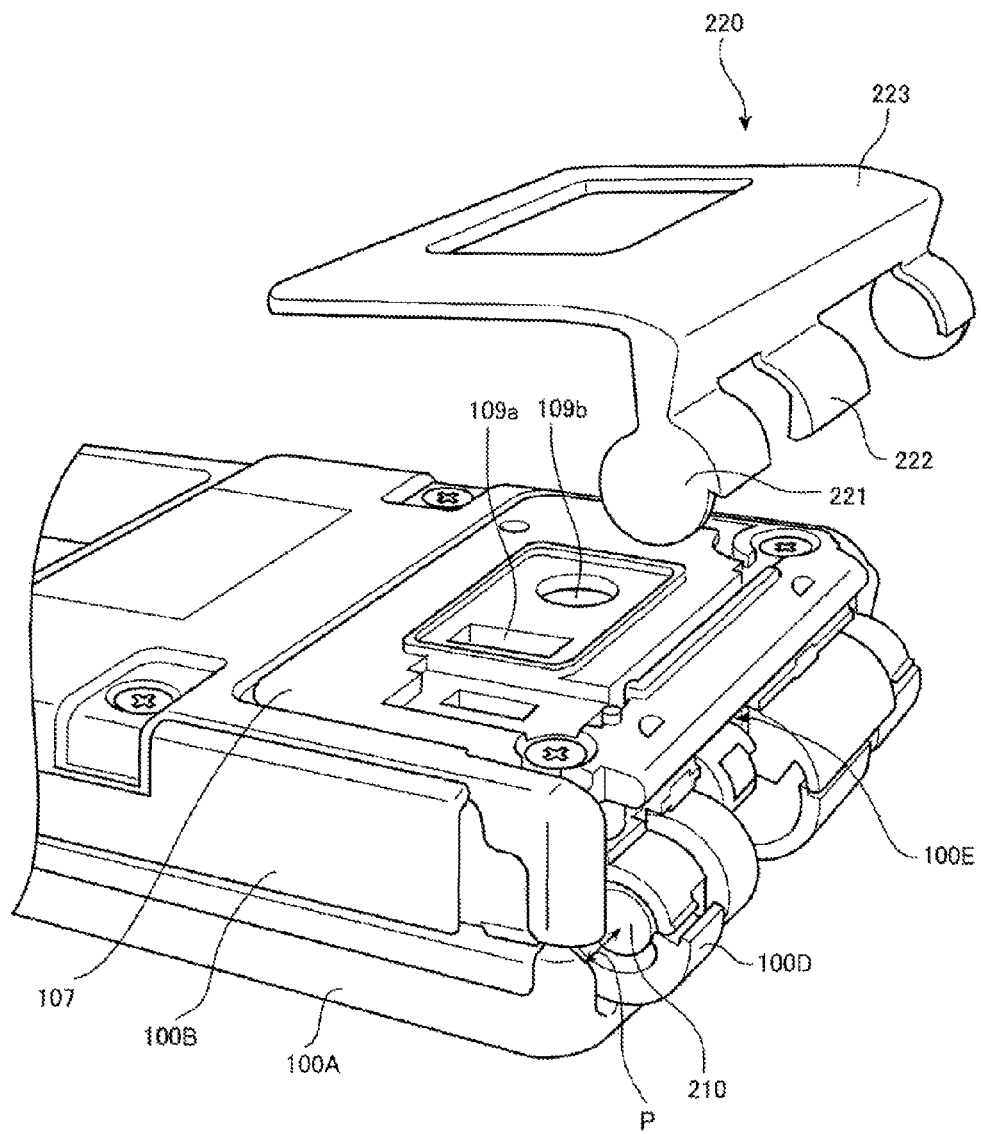
FIG. 6 is an enlarged view near the hinge section.

FIG. 6 is an enlarged view near the hinge section 100C.

When the hinge 210 is attached in the groove 100E in FIG. 5, the hinge cover section 100D provided on the upper housing 100A and the lower housing 100B cover the hinge 210, and the upper housing 100A and the lower housing 100B are coupled in a rotatable manner around the hinge 210.

Then, a double-sided tape is adhered on the housing cover section 223 of the hinge cover 220, and the end cover sections 221 of the hinge cover 220 are fitted into gaps P between the respective ends of the hinge 210, and the upper housing 100A and the lower housing 100B. Consequently, the housing cover section 223 of the hinge cover 220 is adhered on the lower housing 100B with the double-sided tape and the claw provided on the hinge cover 220 is fitted into the claw fixing section 1001, so that the hinge cover 220 is attached to the hinge 210, the upper housing 100A, and the lower housing 100B.

In the cellular phone 100 with the hinge cover 220 attached thereto, the hinge cover section 100D and the outer circumference cover section 222 of the hinge cover 220 cover the outer circumferential surface of the hinge 210, the end cover sections 221 of the hinge cover 220 cover both ends of the hinge 210, and the housing cover section 223 of the hinge cover 220 covers the screws 190 and the long-range antenna 107 provided on the lower housing 100B.

In this way, according to the cellular phone 100 of this embodiment, it is not necessary to attach hinge caps separately on each end of the hinge, and the hinge can be reliably hidden only with the hinge cover 220. Further, by covering the long-range antenna 107 and the screws 190 with the hinge cover 220, dirt and damage of the long-range antenna 107 can be prevented without increasing the number of parts. In addition, the appearance of the cellular phone 100 can be improved.

Figure 7:
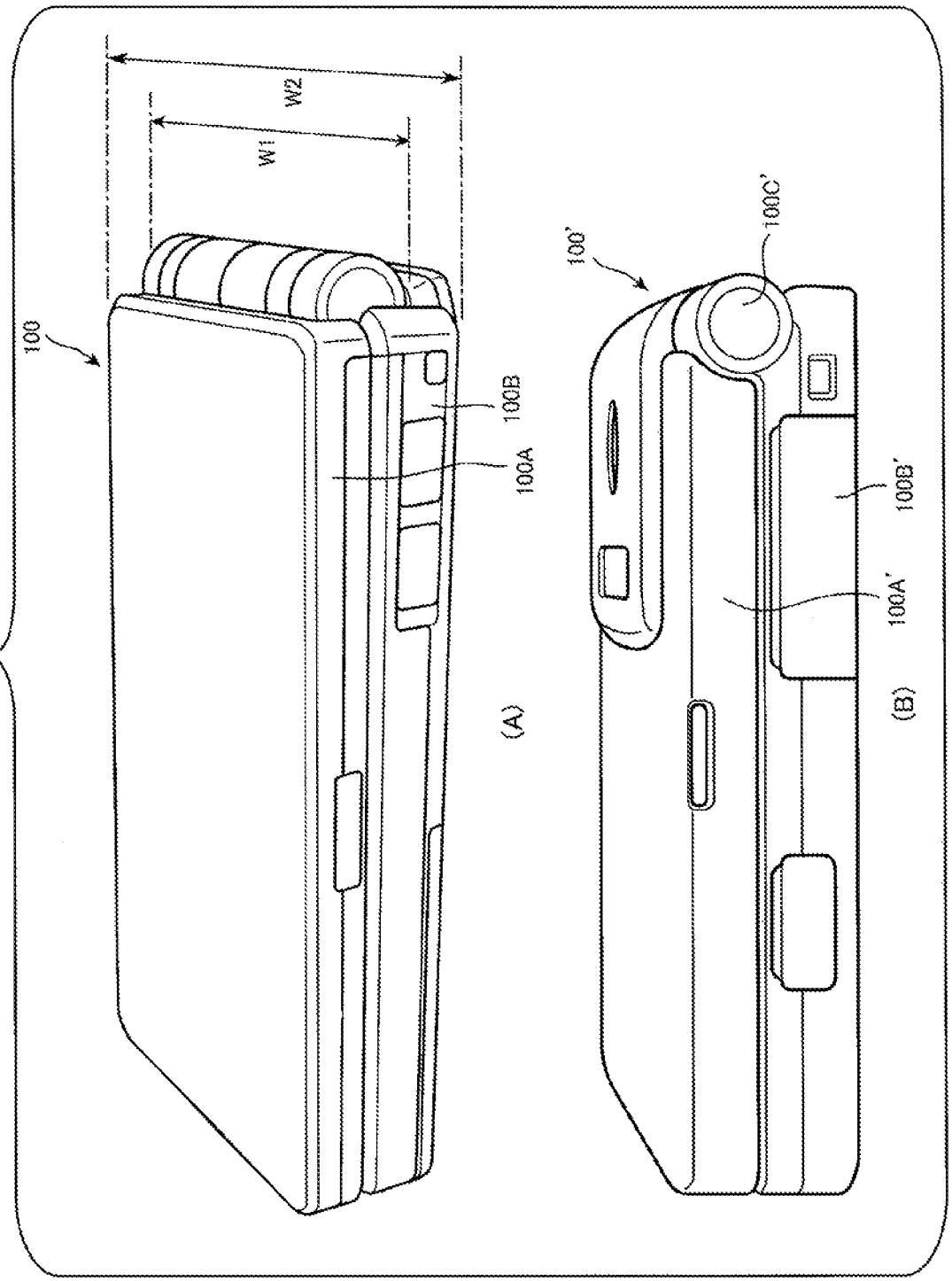
FIG. 7 is an outside view of the cellular phone of the present invention and a conventional cellular phone.

FIG. 7 is an outside view of the cellular phone 100 of this embodiment and a conventional cellular phone 100'.

In the conventional cellular phone 100', a hinge cap is separately attached on each end of the hinge, in addition to the hinge cover which covers the outer circumferential surface of the hinge. Therefore, the number of parts increases. In addition, in order to attach the separate hinge caps to both ends of the hinge, it is necessary to extend the hinge section 100C' to both ends of the upper housing 100A' and the lower housing 100B' as shown in part (B) of FIG. 7, which results in problems of limiting design of the cellular phone 100' and inhibiting slim design of the cellular phone 100'.

As shown in part (A) of FIG. 7, in the cellular phone 100 of this embodiment, the hinge 210 can be reliably hidden and the length W1 of the hinge section 100C can be shorter than the length W2 of the upper housing 100A and the lower housing 100B in their width direction. Therefore, design of the cellular phone 100 can be improved and the cellular phone 100 can be slim.

Here, note that the cellular phone 100 has a watertight function without the hinge cover 220. In the manufacturing process of the cellular phone 100, a watertight test has been carried out before attachment of the hinge cover 220. The hinge cover 220 is attached to the cellular phone 100 which has passed the watertight test, in order to finish the final product. The cellular phone 100 which has failed the watertight test is delivered to a readjusting process and readjusted there, and then the hinge cover 220 is attached to the cellular phone after having passed a retest. Thus, because the cellular phone 100 has watertight function without the hinge cover 220, the watertight test can be carried out without attaching the hinge cover 220, so that tasks of repeatedly attaching and removing the hinge cover 220 in the readjusting process can be omitted.

So far, the configuration near the hinge section 100C of the cellular phone 100 has been described. Then, the configuration on the back surface of the upper housing 100A will be described.

Figure 8:
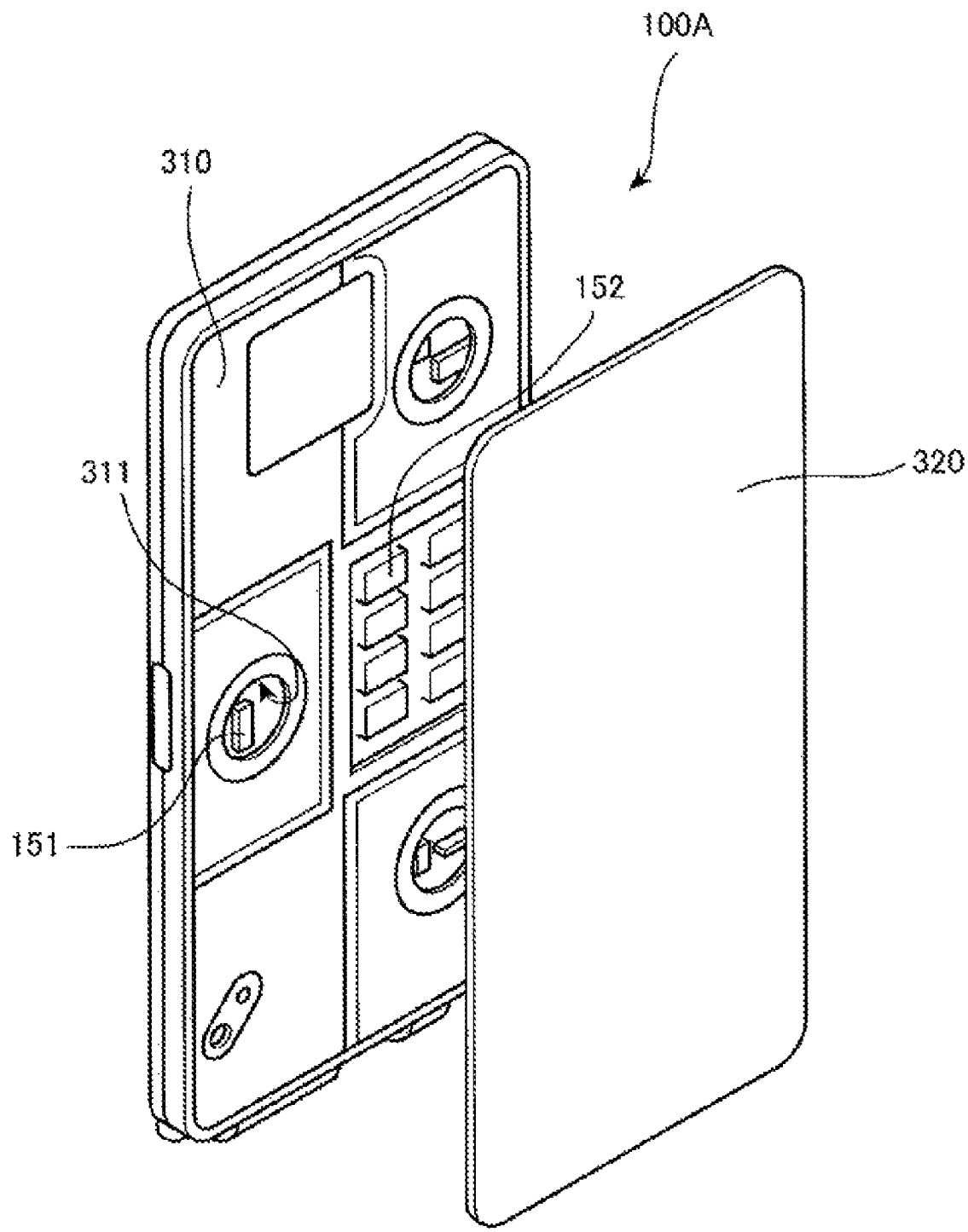
FIG. 8 is an exploded perspective view of the upper housing.

FIG. 8 is an exploded perspective view of the upper housing 100A.

The upper housing 100A is composed of a case 310 in which various parts are accommodated and a panel 320 covering the case 310. The case 310 has a hole 311 in which the backlight 151 and the back surface liquid crystal panel 152 also shown in FIG. 4 are placed. Further, the panel 320 is a colored thin plate made of acryl and is translucent. The case 310 corresponds to an example of a box section referred in this invention, the panel 320 corresponds to an example of a panel referred in this invention, and the backlight 151 corresponds to an example of a light source referred in this invention.

In addition, on the surface of the panel 320 facing the case 310, a light shielding plate 330 (see FIG. 9) for shielding light is affixed.

Figure 9:
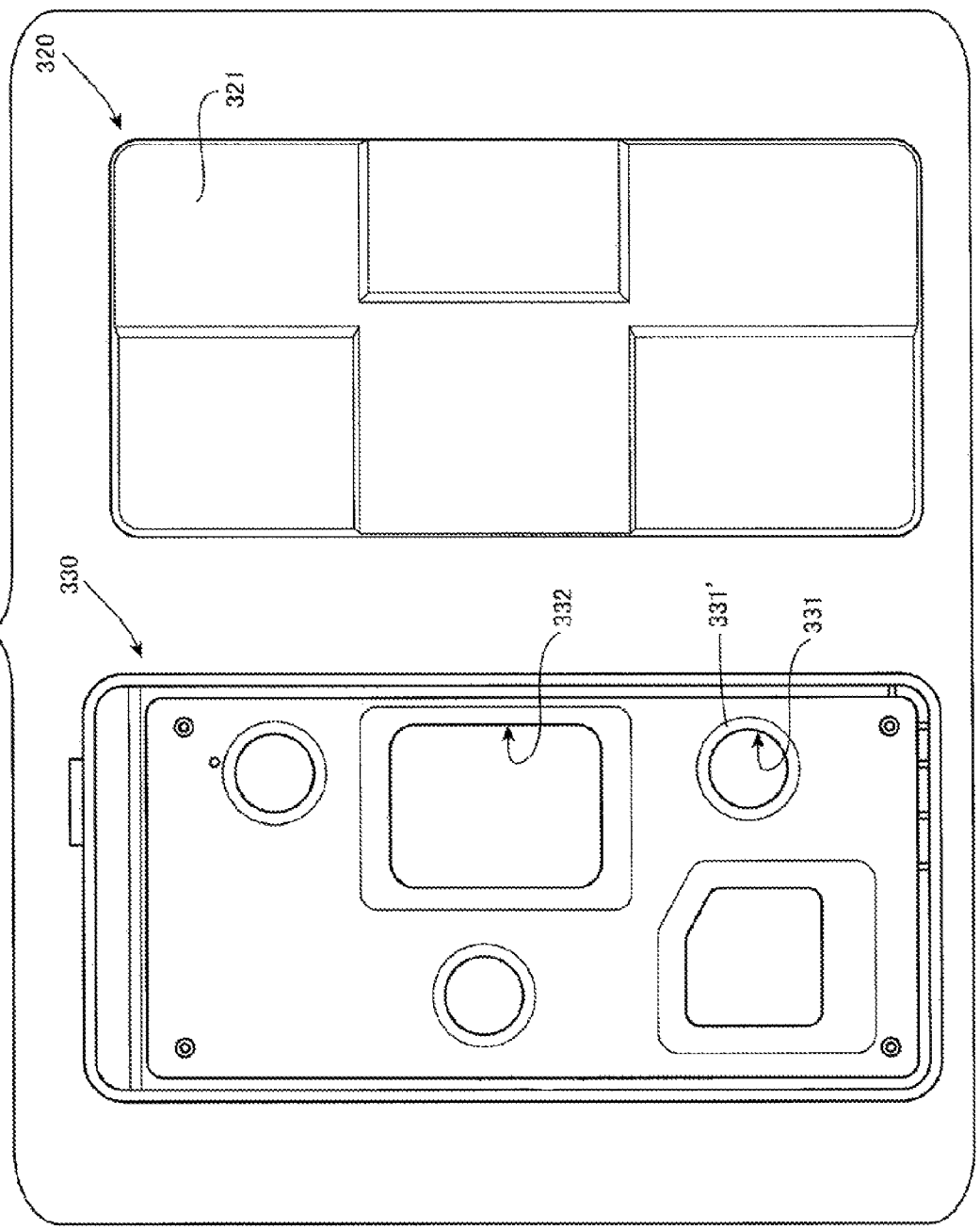
FIG. 9 is a view showing a surface of the panel facing the case and a light shielding plate affixed on the surface.

FIG. 9 is a view showing the surface of the panel 320 facing the case 310 and the light shielding plate 330 affixed on the surface.

As shown in FIG. 9, on this surface of the panel 320, a light diffusion transmission layer 321 is formed by applying white paint. The light diffusion transmission layer 321 corresponds to an example of a light diffusion transmission layer referred in this invention.

Further, through holes 331, 332 are provided in the light shielding plate 330 at portions corresponding to the backlight 151 and the back surface liquid crystal panel 152 shown in FIG. 8. A circumferential edge 331' of the through hole 331 corresponding to the backlight 151 is tapered toward the panel 320. The light shielding plate 330 corresponds to an example of a light shielding plate referred in this invention.

Light emitted from the backlight 151 passes through the through hole 331 of the light shielding plate 330 and is diffused in the light diffusion transmission layer 321 of the panel 320, so that the softened light emits from the panel 320. Additionally, because the light emitted from the backlight 151 is diffusedly reflected at the tapered circumferential edge 331', faint gentle light can be displayed on the panel 320.

Further, because portions other than the portions corresponding to the backlight 151 and the back surface liquid crystal panel 152 are covered by the light shielding plate 330, it can be avoided that various parts accommodated in the case 310 can be disadvantageously seen through the panel 320.

Moreover, because the light diffusion transmission layer 321 of the panel 320 is applied with white paint, the diffusivity of light is increased and the effect of hiding various parts in the case 310 is also improved.

Thus, according to the cellular phone 100 in this embodiment, it is not necessary to provide a frosted glass for diffusing light and therefore increase in size and cost of the apparatus can be inhibited. In addition, it can be avoided that the parts in the housing can be disadvantageously seen through. Further, gentle light can be displayed.

So far, the configuration on the back surface of the upper housing 100A has been described. Then, the configuration near the rechargeable battery 180 shown in FIG. 4 will be described.

In this embodiment, the rechargeable battery 180 is removably accommodated in the lower housing 100B and is shielded from water by covering with the lid and the cover.

Figure 10:
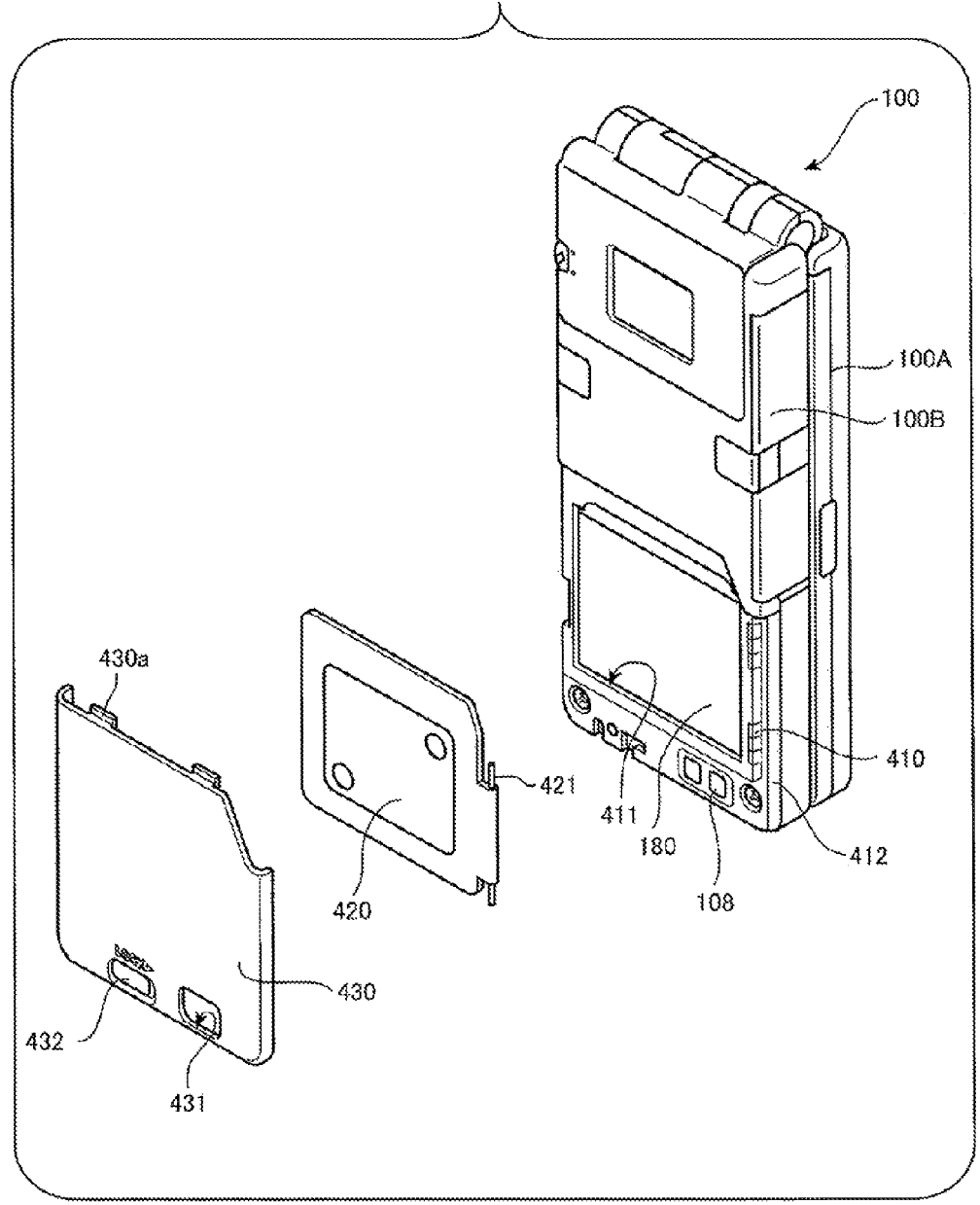
FIG. 10 is an exploded perspective view of the lower housing of the cellular phone when a lid and a cover covering a rechargeable battery 180 are removed.

FIG. 10 is an exploded perspective view of the lower housing 100B of the cellular phone 100 when a lid 420 and a cover 430 covering the rechargeable battery 180 are removed.

In the lower housing 100B, an opening section 411, a shaft receiving section 410, and a guide 412 are formed and the rechargeable battery 180 is fitted into the opening section 411. The rechargeable battery 180 is connected to the charging terminal 108 also shown in FIG. 3 and connected to various elements constituting the cellular phone 100 shown in FIG. 4. The shaft receiving section 410 is composed of a shaft fitting section in which a shaft is fitted and a stopper by which the lid 420 is supported. The guide 412 is a groove which is withdrawn inward by an amount of thickness of the cover 430, so that the cover 430 is slid along the guide 412. The shaft receiving section 410 corresponds to an example of a shaft receiving section referred in this invention, the guide 412 corresponds to an example of a guide referred in this invention, and the rechargeable battery 180 corresponds to an example of an accommodated object referred in this invention.

The lid 420 is equipped with a shaft 421 which is rotatably attached to the shaft receiving section 410 of the lower housing 100B. The shaft 421 is removably attached to the shaft receiving section 410 such that the lid 420 laterally opens and closes the opening section 411 of the lower housing 100B. The shaft 421 corresponds to an example of a shaft referred in this invention and the lid 420 corresponds to an example of a lid referred in this invention.

The cover 430 has a claw 430a on its top and is attached to the lower housing 100B in a perpendicular direction by fitting the claw 430a into a claw fixing section (not shown) provided in the lower housing 100B. Additionally, the cover 430 has a through hole 431 in which the charging terminal 108 is fitted and a lock mechanism 432 which is locked to the lower housing 100B. The lock mechanism 432 corresponds to an example of a lock mechanism referred in this invention and the cover 430 corresponds to an example of a cover referred in the present invention.

The cover 430 has the claw 430a and is slid along the guide 412 of the lower housing 100B and attached to the lower housing 100B by fitting the claw 430a into the claw fixing section (not shown) provided in the lower housing 100B. Additionally, the cover 430 has the through hole 431 in which the charging terminal 108 is fitted and the lock mechanism 432 which is locked to the lower housing 100B. The lock mechanism 432 corresponds to an example of a lock mechanism referred in this invention and the cover 430 corresponds to an example of a cover referred in the present invention.

First, the lid 420 will be described in detail.

Figure 11:
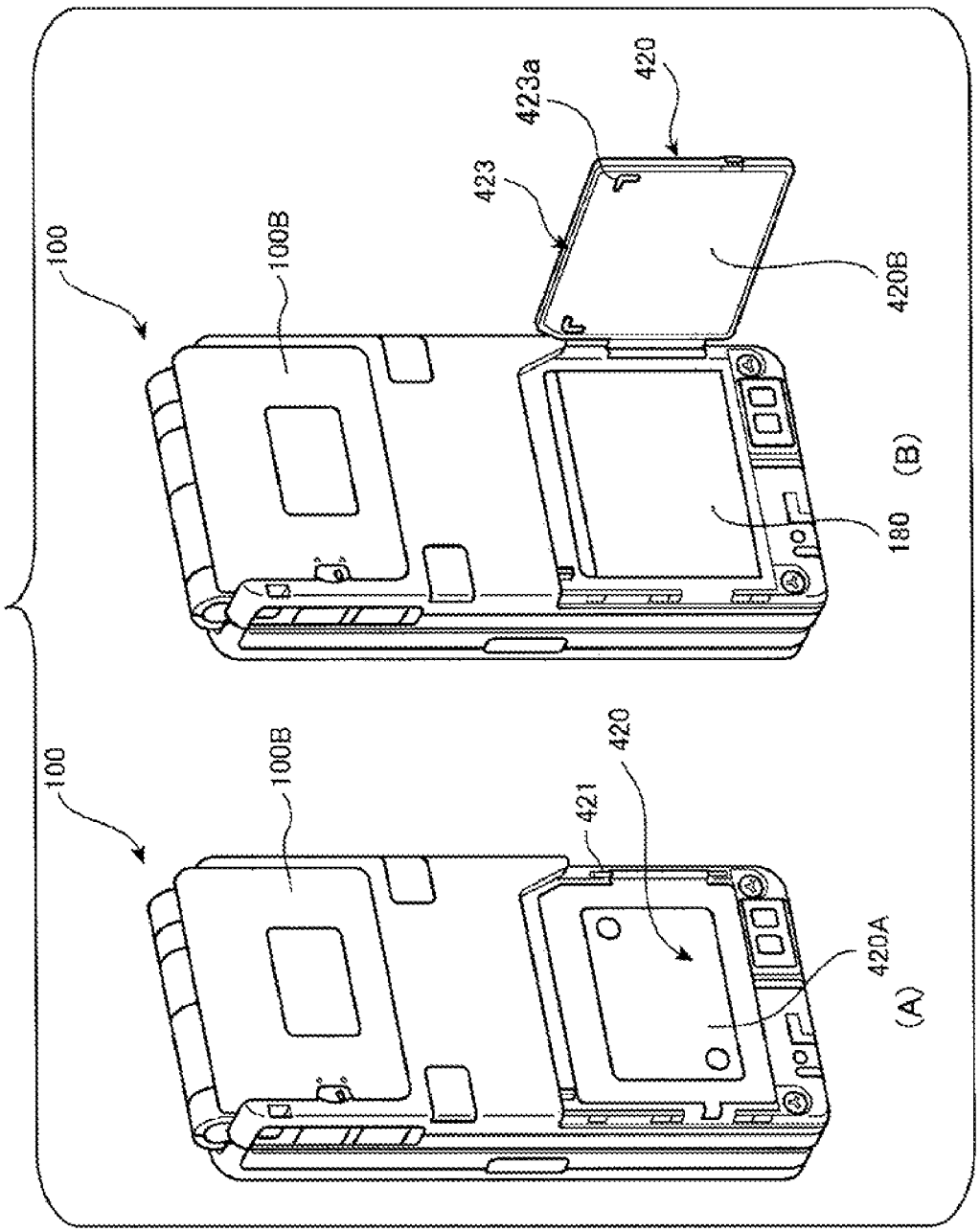
FIG. 11 is a view showing states in which the lid is opened and closed.

FIG. 11 is a view showing states in which the lid 420 is opened and closed.

In part (A) of FIG. 11, the state in which the lid 420 is closed is shown. The cover facing surface 420A of the lid 420 facing the cover 430 is formed of a metal plate which is non-permeable to water. The lid 420 has a claw (not shown) and is fixed to the lower housing 100B by fitting the claw into the claw fixing section (not shown) provided in the lower housing 100B, when the lid 420 is closed and pushed toward the lower housing 100B.

On the other hand, in part (B) of FIG. 11, the state in which the lid 420 is opened is shown. A rechargeable battery facing section 420B of the lid 420 facing the rechargeable battery 180 is formed of an elastic material. Further, a convex section 423 made of an elastic material is formed which surrounds the opening section 411 of the lower housing 100B. Moreover, on the rechargeable battery facing section 420B, several auxiliary convex sections 423a made of an elastic material are provided.

Then, the cover 430 will be described in detail.

Figure 12:
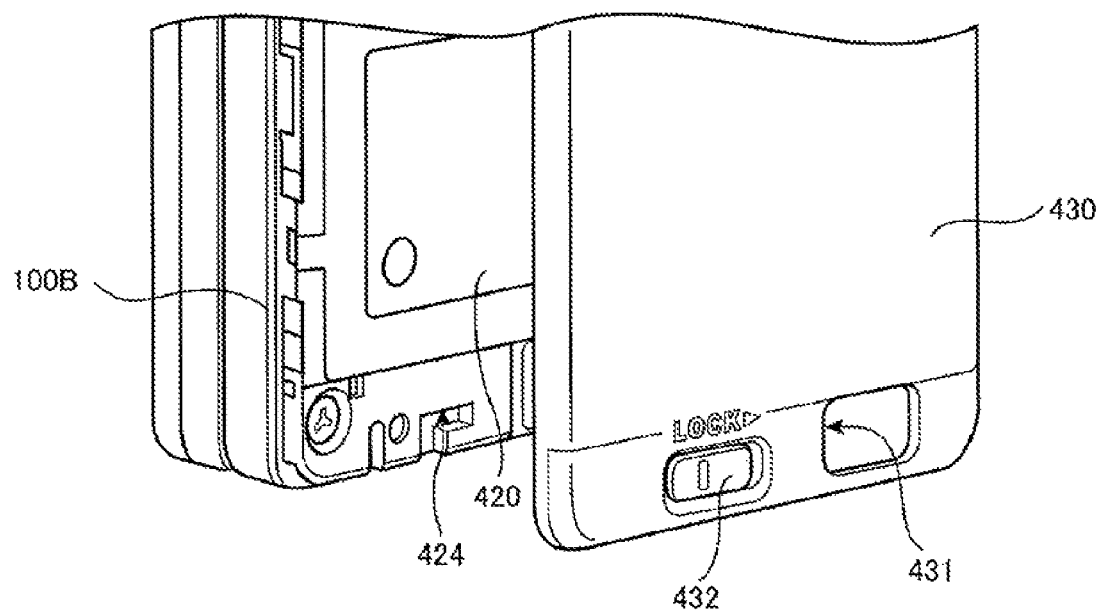
FIG. 12 is an enlarged view of the cover and the lower housing near a lock mechanism.
Figure 13:
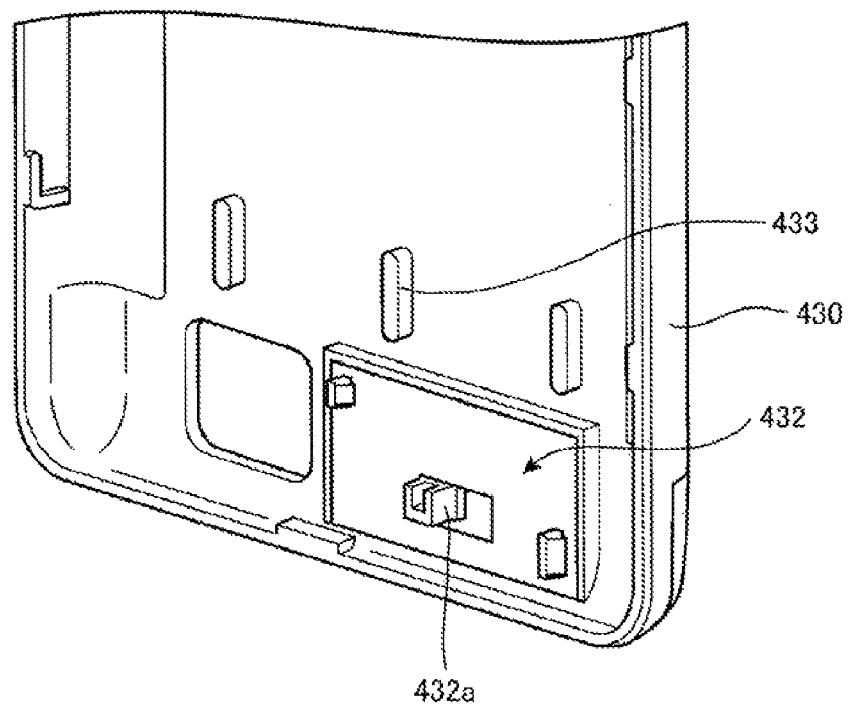
FIG. 13 is a view showing a housing facing surface of the cover facing the lower housing.

FIG. 12 is an enlarged view of the cover 430 and the lower housing 100B near the lock mechanism 432 and FIG. 13 is a view showing a housing facing surface of the cover 430 facing the lower housing 100B.

As shown in FIG. 12, an L-shaped groove 424 is formed in the lower housing 100B at a position facing the lock mechanism 432.

Further, as shown in FIG. 13, on the housing facing surface of the cover 430, a lock lever 432a is provided which is fitted into the groove 424 of the lower housing 100B and several convex sections 433 are formed at portions facing the lid 420. The cover 430 is attached to the lower housing 100B in the perpendicular direction and the lock lever 432a which constitutes the lock mechanism 432 is slid along the groove 424 of the lower housing 100B, so that the cover 430 is reliably locked to the lower housing 100B.

When attaching the rechargeable battery 180 to the cellular phone 100, the user accommodates the rechargeable battery 180 in the opening section 411 of the lower housing 100B shown in FIG. 10, closes the lid 420 to fix the claw of the lid 420 shown in FIG. 11 to the lower housing 100B and then slides the cover 430 shown in FIG. 10 along the guide 412 of the lower housing 100B. As a result, the claw 430a of the cover 430 is fitted into the claw fixing section provided in the lower housing 100B. Then, the cover 430 is fitted into the lower housing 100B and the lock mechanism 432 is locked.

Figure 14:
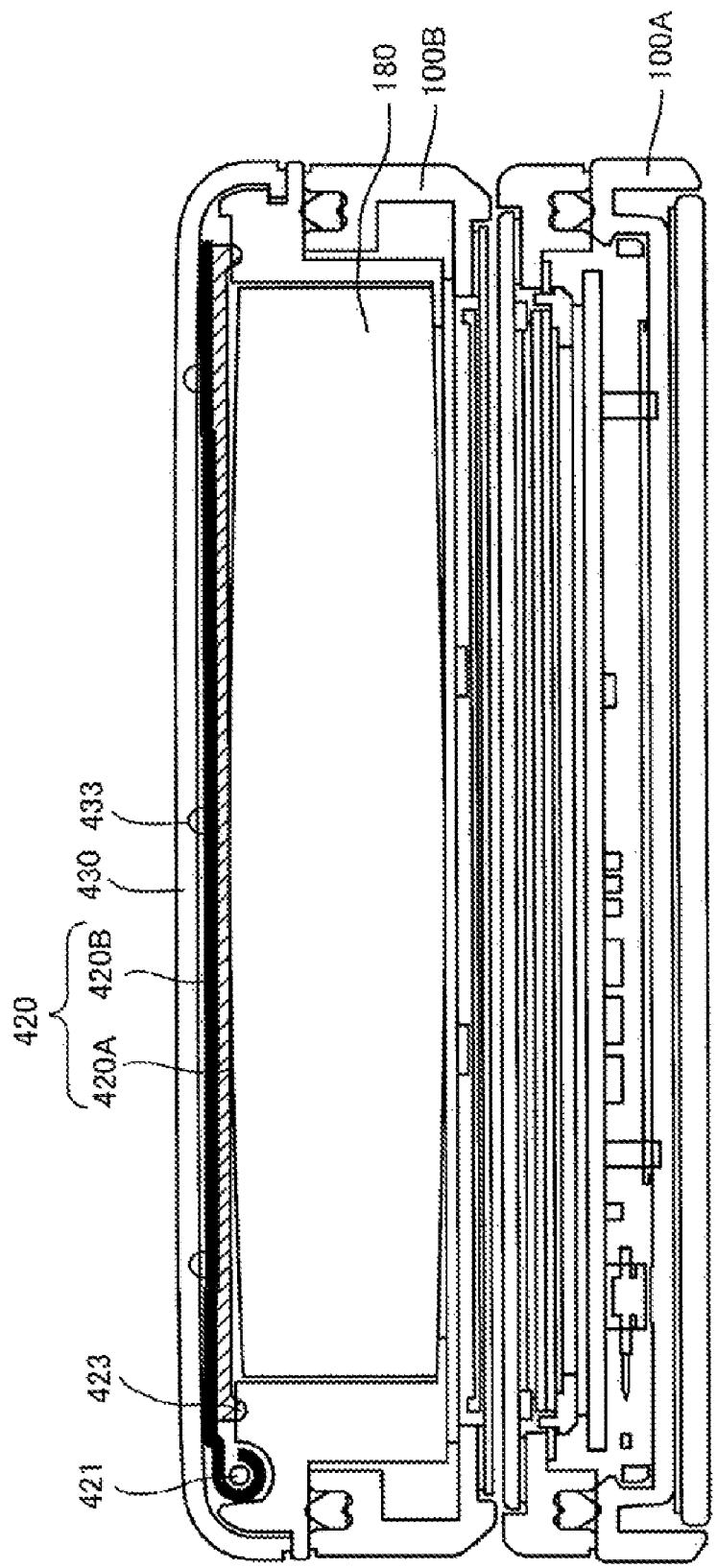
FIG. 14 is a cross sectional view cut in the width direction of the cellular phone with the rechargeable battery attached therein.

FIG. 14 is a cross sectional view cut in the width direction of the cellular phone 100.

As shown in FIG. 14, the convex section 433 of the cover 430 presses the lid 420 so that the convex section 423 of the lid 420 and the auxiliary convex sections 423a shown in FIG. 11 are pressed onto the lower housing 100B. Because the convex section 423 of the lid 420 is formed of an elastic material and surrounds the opening section 411 of the lower housing 100B in which the rechargeable battery 180 is accommodated, the opening section 411 is closed by the lid 420 without any gap.

In this way, according to the cellular phone 100 of this embodiment, when the user simply closes the lid 420 and attaches the cover 430, the cover 430 presses the lid 420 so that the lid 420 reliably closes the opening section 411. Therefore, the rechargeable battery 180 can be easily shielded from water, even by users who are weak such as children and elderly persons. Further, because the lid 420 is opened and closed by being rotated around the shaft extending in the same direction as the sliding direction of the cover 430, it can be avoided that the lid 420 is accidentally opened when the cover 430 is attached or removed, which can lead to damage of the lid 420.

So far, the configuration near the rechargeable battery 180 has been described. Then, the configuration near the charging terminal 108 shown in FIG. 3 will be described.

Figure 15:
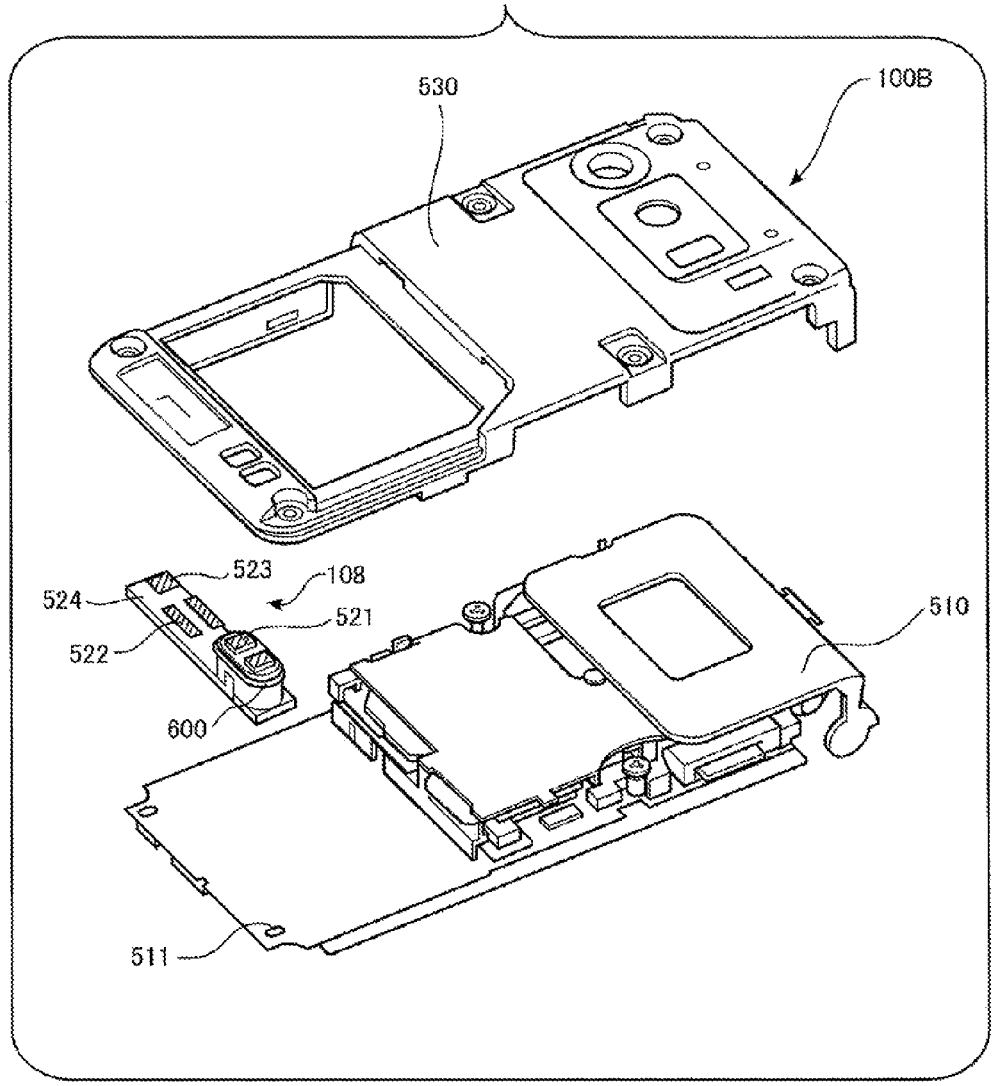
FIG. 15 is an exploded perspective view of the lower housing.

FIG. 15 is an exploded perspective view of the lower housing 100B.

The lower housing 100B includes a body substrate 510 provided with various electronic parts for achieving the telephone call function and the like, the charging terminal 108 which is connected to the body substrate 510 and is partially exposed on the back surface of the lower housing 100B, and a fixing case 530 which is mounted to the body substrate 510 with the charging terminal 108 between the fixing case and the body substrate 510. Although the rechargeable battery 180, the lid 420, the cover 430 and the like shown in FIG. 10 are also attached in the lower housing 100B, they are not shown here for simplicity of the description.

In the body substrate 510, a metal spring 511 is provided for urging the charging terminal 108 toward the fixing case 530. In the fixing case 530, an opening section is formed in which a part of the charging terminal 108 is fitted.

The charging terminal 108 includes, on a substrate made of plastic, a nonconductive section 524 which is nonconductive and a battery contact 521, a vibrator contact 522, and a connecting section 523 connected to the battery contact 521 and the vibrator contact 522. An O-ring 600 is attached to the battery contact 521, surrounding the battery contact 521. The O-ring 600 corresponds to an example of an O-ring referred in this invention and also corresponds to an example of a watertight member referred in this invention.

Figure 16:
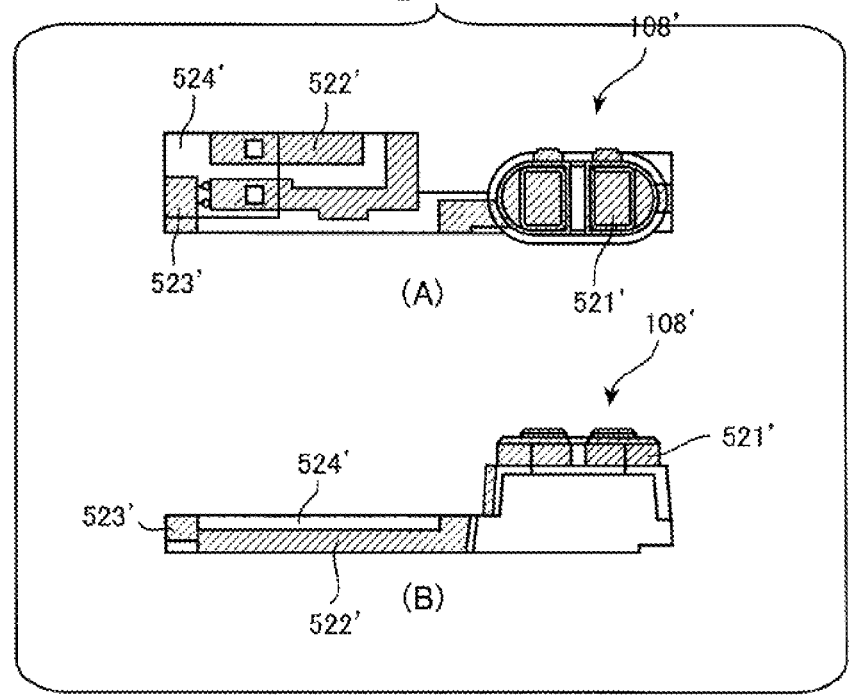
FIG. 16 is a view showing the charging terminal in process of manufacturing.

FIG. 16 is a view showing the charging terminal 108 in process of manufacturing.

Part (A) of FIG. 16 is a top view of the charging terminal 108 in process of manufacturing and part (B) of FIG. 16 is a side view of the charging terminal 108 in process of manufacturing.

In manufacturing the charging terminal 108 shown in FIG. 15, at first, a PC resin (polycarbonate) on which plating is not deposited and an ABS resin (copolymer compound of acrylonitrile, butadiene, and styrene) on which plating is deposited are two-color molded to form the terminal substrate 108'.

The ABS resin corresponds to an example of a "first material on which plating is deposited" referred in this invention and the PC resin corresponds to an example of a "second material on which plating is not deposited" referred in this invention.

As shown in FIG. 16, in the terminal substrate 108', the nonconductive part 524' corresponding to the nonconductive part 524 shown in FIG. 15 is formed of the PC resin and conductive parts 521', 522', 523' corresponding to the battery contact 521, the vibrator contact 522, and the connecting part 523 are formed of the ABS resin.

Subsequently, the terminal substrate 108' is subjected to plating process. As a result, plating is not deposited on the nonconductive part 524' formed of the PC resin and is deposited only on the conductive parts 521', 522', 523' formed of the ABS resin, so as to form the charging terminal 108.

In this way, by two-color molding the resin on which plating is deposited and the resin on which plating is not deposited in order to form the terminal substrate and then performing the plating process for the terminal substrate so as to form the terminal, the terminal having superior conductivity and uniform thickness can be formed.

Figure 17:
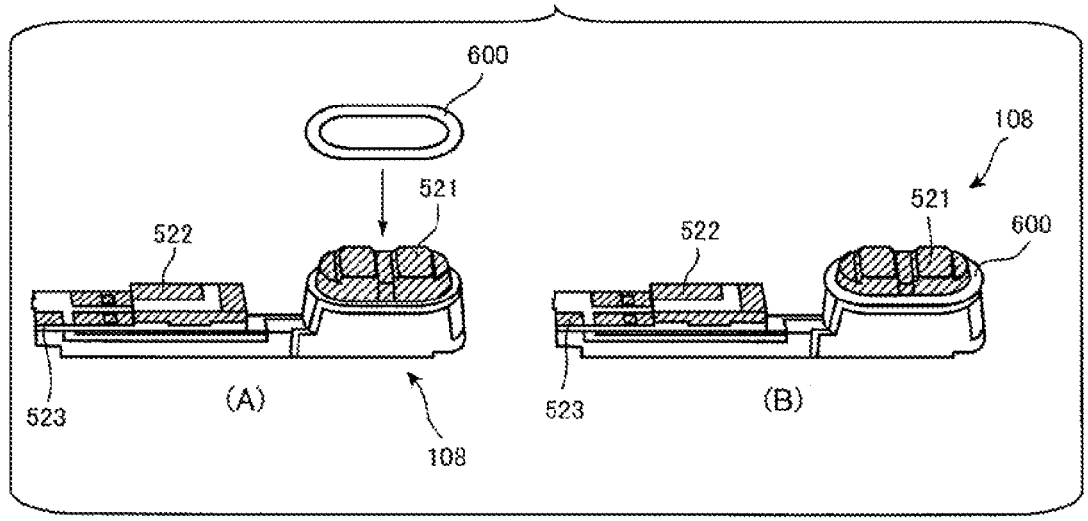
FIG. 17 is a view showing the charging terminal after being subjected to plating process.

FIG. 17 is a view showing the charging terminal 108 after being subjected to the plating process.

Part (A) of FIG. 17 shows the charging terminal 108 just after being subjected to the plating process and part (B) of FIG. 17 shows the charging terminal 108 after the O-ring 600 is attached.

As shown in FIG. 17, plating is deposited on the conductive parts 521', 522', 523' formed of the ABS resin in the terminal substrate 108' to form the battery contact 521, the vibrator contact 522, and the connecting part 523. Plating is not deposited on the nonconductive part 524' formed of the PC resin in the terminal substrate 108'.

The battery contact 521 projects and the O-ring 600 is attached so as to surround the projecting battery contact 521.

Figure 18:
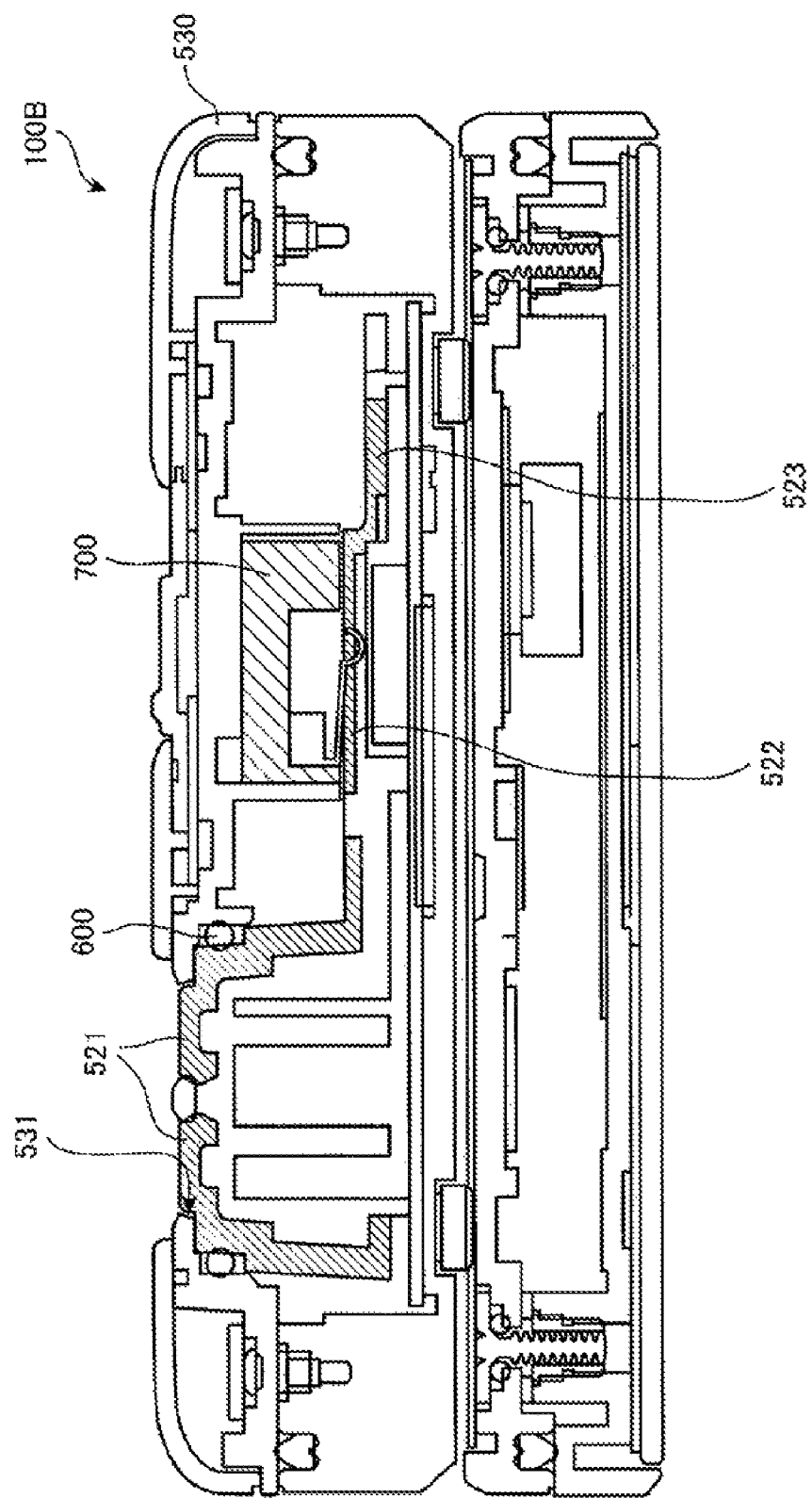
FIG. 18 is a cross sectional view cut in the width direction of the lower housing with the charging terminal attached thereto.

FIG. 18 is a cross sectional view cut in the width direction of the lower housing 100B with the charging terminal 108 attached thereto.

As shown in FIG. 18, the battery contact 521 of the charging terminal 108 is fitted in the opening section 531 of the fixing case 530 and is exposed in the lower housing 100B of the cellular phone 100. However, because a gap between the opening section 531 and the battery contact 521 is closed by the O-ring 600, entry of water into the lower housing 100B is reliably prevented.

In addition, the vibrator contact 522 of the charging terminal 108 is connected to a vibrator 700 which vibrates the cellular phone 100 when telephone calls or electronic mails are received, for example. By providing the charging terminal 108 with the contact for charging and the contact for the vibrator 700, the number of parts can be reduced and manufacturing cost and size of the apparatus can be minimized.

Figure 19:
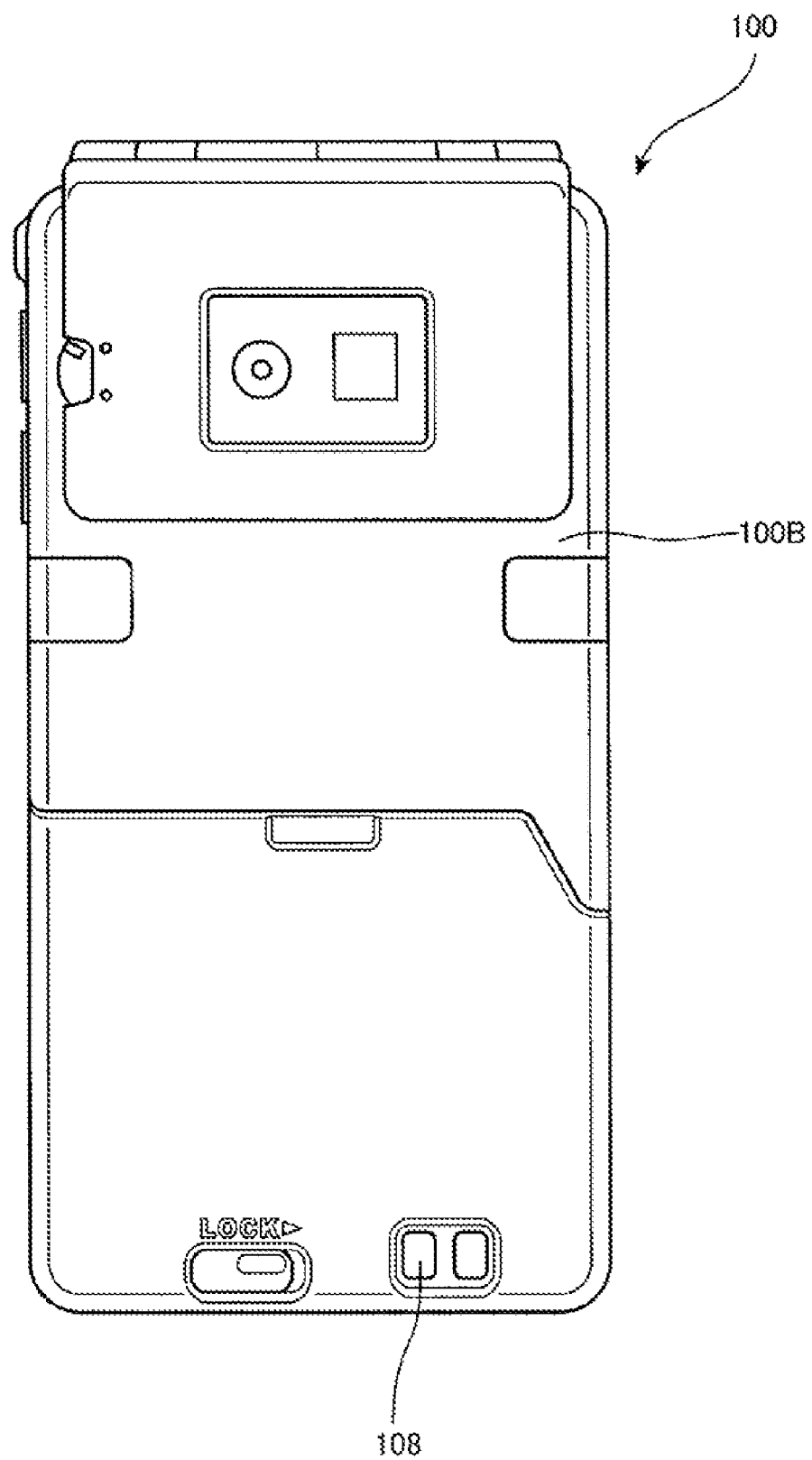
FIG. 19 is a view showing the back surface of the lower housing.

FIG. 19 is a view showing the back surface of the lower housing 100B.

According to the cellular phone 100 of this embodiment, a terminal having superior conductivity and uniform thickness can be formed and therefore the thickness and the adhesion surface of the watertight member (the O-ring 600) can be minimized so that size reduction of the apparatus and reliable watertight property can be simultaneously achieved. In addition, a plus contact and a minus contact can be reliably polarized without processing a metal plate or the like and further the adhesion surface of the O-ring 600 can be reduced. Therefore, the area of the charging terminal 108 connected to the charger can be increased to improve the charging efficiency.

Although the example of applying the mobile terminal apparatus of the present invention to the cellular phone has been described in the above description, the mobile terminal apparatus of the present invention may be applied to a PDA and the like.

Further, although the example of providing a light diffusion transmission layer formed of white paint applied on the panel has been described in the above description, the mobile terminal apparatus of the present invention can be provided with a light diffusion transmission layer formed by applying paint other than white paint. While light diffusion efficiency can be improved by using the light diffusion transmission layer formed of white paint, light diffusion effect can be also obtained with gray paint and the like.

Further, although the example of shielding the rechargeable battery accommodated in the housing from water by using the lid and the cover has been described in the above description, the mobile terminal apparatus of the present invention may be adapted to shield a recording media accommodated in the housing from water by using the lid and the cover.

Further, although the example of forming the charging terminal by two-color molding the ABS resin and the PC resin has been described in the above description, the terminal in the present invention may be formed by using a combination of a resin on which gold plating is deposited and a resin on which gold plating is not deposited, other than the ABS resin and the PC resin.

What is claimed is:

1. A mobile terminal apparatus comprising:
 a housing having an opening section in which an accommodated object is fitted;
 a lid covering the opening section, the lid comprising a protrusion which surrounds the opening section and shields the accommodated object from water, the protrusion being disposed on a surface facing the accommodated object; and
 a cover covering the lid, the cover being attached to the housing, wherein the housing comprises a guide extending in a predetermined direction, the cover is slid along the guide and thereby attached to the housing, and the lid opens and closes around a rotating shaft extending in a direction in which the cover is slid.

2. The mobile terminal apparatus according to claim 1, wherein the protrusion of the lid is elastic.

3. The mobile terminal apparatus according to claim 1, wherein the housing comprises a shaft receiving section which receives the shaft in a rotatable manner, the shaft being removably attached to the shaft receiving section.

* * * * *